United States Patent [19]

Tung et al.

[11] 3,921,211

[45] Nov. 18, 1975

[54] SELF-CLOCKING, TWO-CHANNEL DIGITAL MAGNETIC RECORDING/PLAYBACK METHOD AND APPARATUS

[75] Inventors: Chung C. Tung, Santa Clara; Robert D. Schweizer, Sunnyvale, both of Calif.

[73] Assignee: Hewlett-Packard Company, Palo Alto, Calif.

[22] Filed: Oct. 17, 1973

[21] Appl. No.: 407,400

[52] U.S. Cl. .................................................. 360/47

[51] Int. Cl. .......................................... G11b 5/09

[58] Field of Search ............. 360/39, 40, 41, 42, 43, 360/44, 48, 51, 47

[56] References Cited

UNITED STATES PATENTS

| | | | |
|---|---|---|---|
| 2,813,259 | 11/1957 | Burkhart | 360/47 |
| 3,281,804 | 10/1966 | Dirks | 360/47 |
| 3,320,598 | 5/1967 | Star | 360/47 |

*Primary Examiner*—Vincent P. Canney
*Attorney, Agent, or Firm*—F. David LaRiviere

[57] ABSTRACT

Magnetic flux reversal only and not the particular state of the flux determines the presence of data for the method of magnetic recording of digital data disclosed herein. In the self-clocking, two-channel arrangement, whenever a "one" bit is to be recorded, a flux reversal is recorded on the "one's" channel. Similarly, whenever a "zero" bit is to be recorded, a flux reversal is recorded on the "zeroes" channel. While a flux transition is completed for every data bit, there is never a transition on both channels at the same instant in time.

8 Claims, 3 Drawing Figures

SELF-CLOCKING, TWO-CHANNEL DIGITAL MAGNETIC RECORDING/PLAYBACK METHOD AND APPARATUS

BACKGROUND AND SUMMARY OF THE INVENTION

Typically prior art methods for two-channel recording of digital data assign the data to one channel and a timing or clock pulse signal to the other channel. The data consists of a serial bit stream of "ones" and "zeroes" wherein a "one" may be represented by a positive going pulse perhaps 1 volt in amplitude, and a "zero" may be represented by the absence of any voltage (zero volts amplitude). The stream of data bits is nonsense unless played back in the same sequence and with respect to the same time base as when it was recorded. To assure proper sequencing and timing, clock pulses are recorded on a second channel while the data is recorded on the first. When played back, the detection equipment utilizes the clock pulses recorded on the clock channel to correlate the beginning and end, as well as to maintain the proper timing and sequence of the stream of data recorded on the data channel.

When the data tracks and the clock tracks become misaligned with respect to one another, data is erroneously played back. Such misalignment or "skew" can result from misalignment of the system record and/or playback heads. It may also result from the recording media passing across the heads along a misdirected path. The amount of skew which can be tolerated varies from system to system and may depend on data and clock pulse widths and recording density. Pulse width and recording density parameters can introduce other system errors which are discussed below.

To avoid errors caused by skew between data and clock channels, single track recording systems have been designed in which clocking is determined from the data itself. In such single-track, self-clocking systems, the data must be coded as it is recorded, then decoded during playback, in order to maintain proper timing and sequencing. Data codes for timing purposes, such as the Miller code, the phase modulation code and the frequency modulation code, are complex and usually operate in high recording densities. However, as the recording density is increased, sensitivity to noise is also increased and the reliability of the system is thereby decreased.

The recording scheme of the present invention is self-clocking, thus avoiding skew between data and clock channels and the need to separately record a timing signal. By recording magnetic flux transitions only on a "one's" channel and on a "zeroes" channel, the system is less sensitive to pulse width and recording density parameters. As will be seen in the description of a preferred embodiment, the system is self-clocking without the use of special codes or detection equipment. A system designed in accordance with the principles of this invention is therefore highly reliable.

DESCRIPTION OF THE PREFERRED EMBODIMENT

The technique for magnetic recording of digital data described herein is not limited by system configuration. It is usable on any system utilizing magnetic material as the data recording medium including disc drives, tape transports and card reader/recorders.

Figure 1:
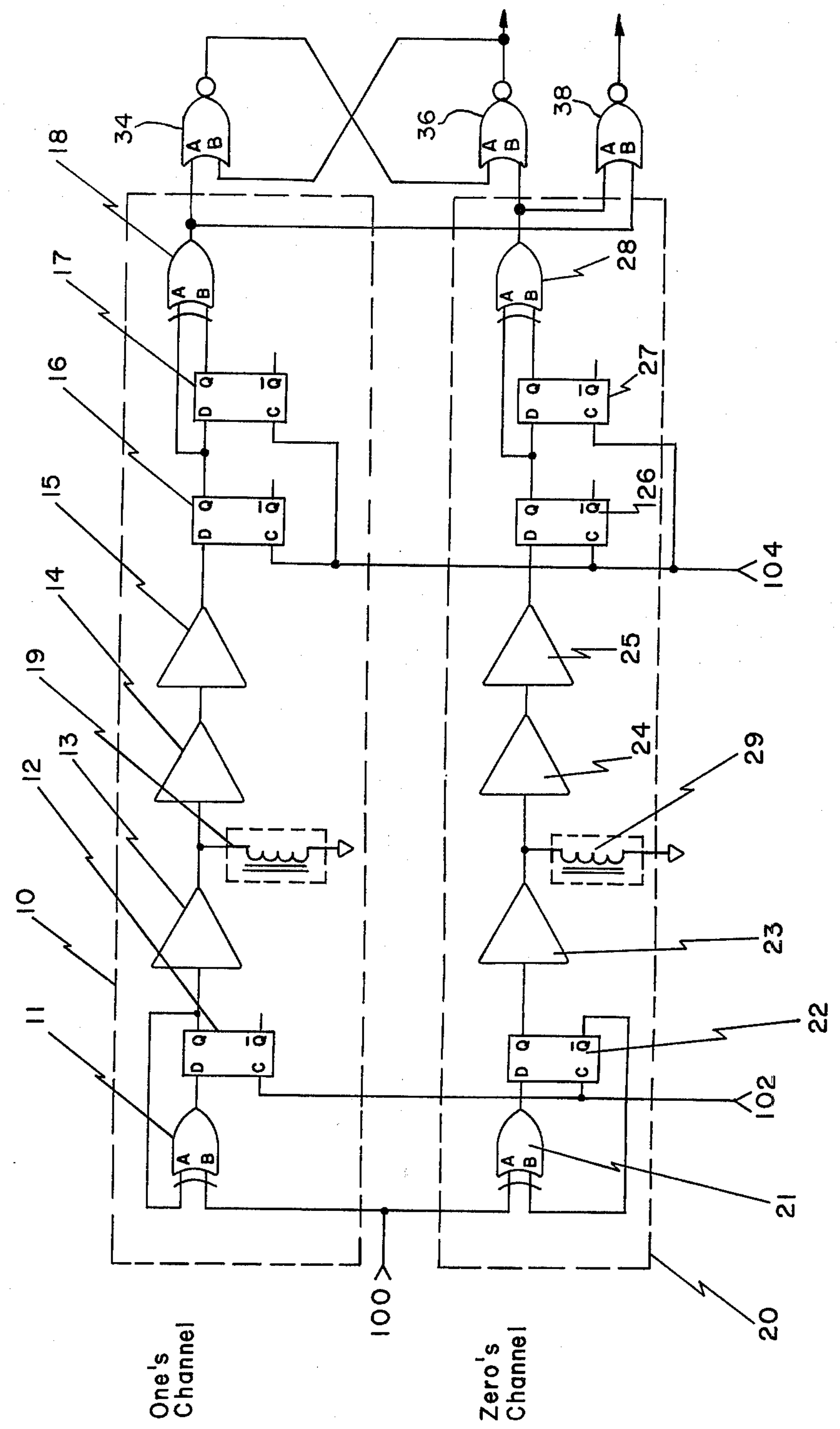
FIG. 1 is a block diagram of a system constructed according to the preferred embodiment of the present invention.

Referring to FIG. 1, a block diagram of a system designed according to this invention is shown. Both channels comprise identical components, and only one interconnection is different. Operational distinctions of the channels will be pointed out later in this specification. "One's" channel 10 comprises input exclusive OR gate 11, flip-flop (ff) 12, record amplifier 13, playback amplifier 14, threshold detector 15, flip-flops 16 and 17, exclusive OR gate 18 and magnetic head 19.

System input 100 is connected to the input of both channels. For the "one's" channel, B input of gate 11 is connected to input 100, and A input is connected to the true output Q of ff 12. The true output Q of ff 12 is also connected to the input of amplifier 13. The output of gate 11 is connected to the D input of ff 12. While the not true output $\overline{Q}$ of ff 12 in the "one's" channel is open, not true output $\overline{Q}$ of ff 22 is returned to the B input of gate 21 in the "zeroes" channel. ($\overline{Q}$ connection of ff 22 is the interconnection which distinguishes the "one's" from the "zeroes" channel in this embodiment of the invention.) The output of amplifier 13 is connected to magnetic head 19 and playback amplifier 14. The output of playback amplifier 14 is connected to threshold detector 15, the output of which is connected to ff 16. Clock input of both flip-flops 16 and 17 are connected to input 104. The output of ff 16 is coupled to the B input of gate 18 through ff 17 and to the other input of gate 18 directly.

The output of the "one's" channel (output of gate 18) is connected to the A input of NOR gate 34 and to the B input of NOR gate 38. The "zeroes" channel output (output of gate 28) is connected to the B input of NOR gate 36 and to the A input of NOR gate 38. The output of gate 34 is connected to the A input of gate 36 and the output of gate 36 is connected to the B input of gate 34 to form the familiar cross-coupled latch circuit.

Each component of the system represented by FIG. 1 operates in the conventional manner. For each of the flip-flops 12, 16, 17, 22, 26 and 27, the output Q responds to the level of the signal at input D when a positive clock pulse is applied at input C. Exclusive OR gates 11 and 21 provide a high output signal whenever both inputs thereof are different, and a low output whenever both inputs thereof are the same. Amplifiers 13 and 23 act as constant current sources while amplifiers 15 and 25 are configured as threshold detecting switches. Amplifiers 14 and 24 amplify the flux changes recorded on the tape for playback.

Figure 2:
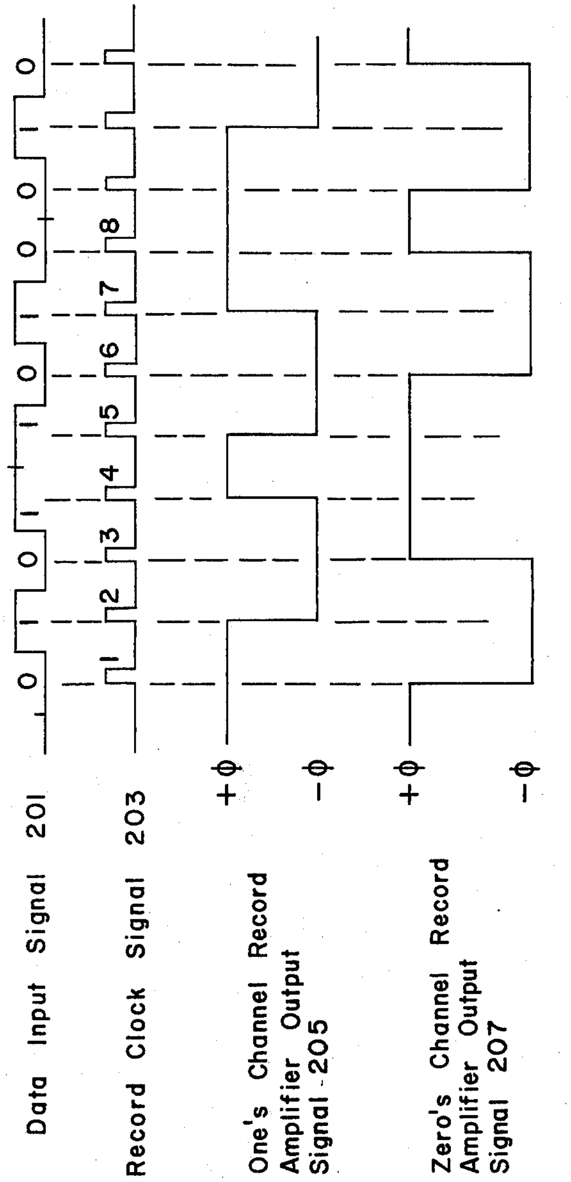
FIG. 2 compares the waveforms at various points in the system of FIG. 1 as the data is recorded.

The assumed initial condition of the record portion of the system is illustrated in FIG. 2 at time = $t_o$. The output state of gate 11 is low since the Q output of ff 12 is low. For the "zeroes" channel, gate 21 output is high since $\overline{Q}$ output for ff 22 is high. Record clock signal 203 is applied to input C of flip-flops 12 and 22 via input 203 Immediately prior to pulse 1 of record clock signal 203. ($CP_1^-$) the output of amplifier 13 in the "one's" channel is high (see signal 205) because both inputs to gate 11 are low and ff 12 does not change state when $CP_1$is applied ($CP_1^+$). However, in the "zeroes" channel, since input A of gate 21 is low and input B is high, the output thereof switches high and, at $CP_1^+$, output Q of ff 22 switches high, $\overline{Q}$ switches low and the output of amplifier 23 switches low (refer to signal 207).

At $CP_2^-$, since input A of gate 11 in the "one's" channel is high and input B is low, the output of this gate is high. Q output of ff 12 switches high and amplifier 13 switches low at $CP_2^+$ as shown in signal 205. For the "zeroes" channel, the output of gate 21 reamins high in response to a high signal at A input and low signal ($\overline{Q}$ of ff 22) at B input. Q output of ff 22 remains high, and the output of amplifier 23 remains low at $CP_2^+$ as shown in signal 207.

At $CP_3^-$ gate 11 output remains high because input A is high and input B is low. Therefore, the state of amplifier 13 remains high at $CP_3^+$ as shown in signal 205. Gate 21 output switches low in response to the low input signal at input A and at input B. At $CP_3^+$, output Q of ff 22 switches low, $\overline{Q}$ switches high and amplifier 23 switches high as signal 207 illustrates. The above-described system design precludes a magnetic flux transition on both channels during the same clock pulse.

Figure 3:
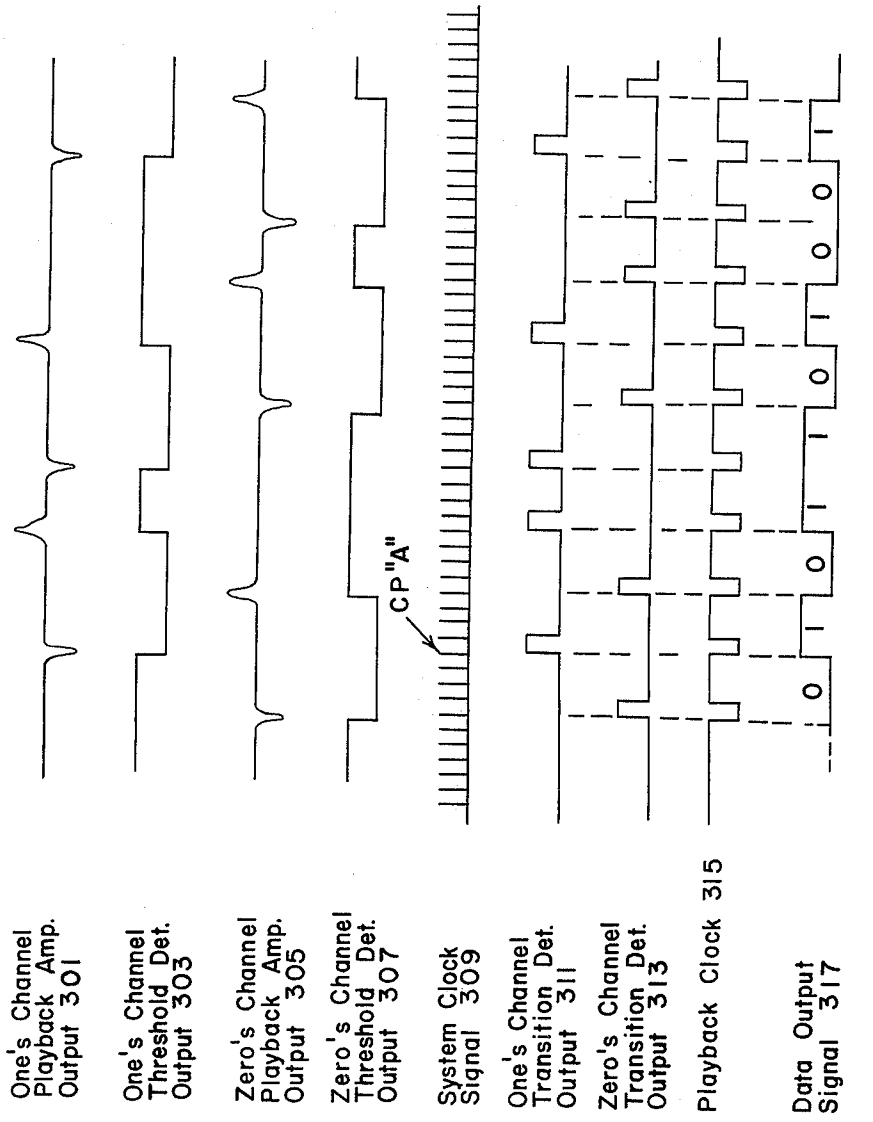
FIG. 3 compares the waveforms at various points in the system of FIG. 1 as the data is played back.

The record portion of the system operates substantially as described above for data entered during subsequent clock pulses. Referring to FIG. 3, the playback portion of the preferred embodiment of the present invention begins in the "one's" channel with amplifier 14, which amplifies the recorded flux reversals and provides an output signal to threshold detector 15 as shown by signal 301. The output of threshold detector 15 is shown by signal 303 which is present at the D input of ff 16. Flip-flops 16 and 17 operate in the same manner as described for ff 12 in response to system clock signal 309. When flip-flops 16 and 17 are in the same state, the output of gate 18 is low, and is the assumed initial condition. The output of gate 18, which operates in the same manner as described for gate 11, remains high for as long as input A and B are not the same. That time is determined by length of time between consecutive pulses of signal 309, since ff 17 will not change state until ff 16 changes state. Therefore, on clock pulse "A" (CP"A") of signal 309, for a low signal applied to the D input, ff 16 changes state which in turn causes gate 18 to switch high. Gate 18 switches low on the next pulse of the signal 309 when ff 17 switches low, applying the same signal level to input B of gate 18 as ff 16 applies to input A. Operation of the "zeroes" channel playback portion is identical to that described above for the "one's" channel.

The "one's" channel and "zeroes" channel outputs, signals 311 and 313 respectively, are applied to the input of the cross-coupled latch circuit. The output of the latch circuit, signal 317, is the reconstituted data recorded as flux reversals on the magnetic medium. The output of gate 38 forms the playback clock signal 315, which, in this embodiment, is the inverse of record clock signal 203.

Unless the data is all "one's" or all "zeroes", the amount of digital data recorded on each track of the media in the form of flux reversals is approximately one-half the density of prior art two-channel recorders for typical data. Decreased recording density provides higher recording reliability. Since the system is self-clocking from the established timing of flux reversals resulting from the digital data itself, the need for a clock track is eliminated and no special recording code is necessary. Tolerances associated head alignment and media movement are significantly easier to maintain than in the prior art systems.

We claim:

1. A self-clocking two-channel apparatus for recording a data signal having first and second phases representing one-bits and zero-bits, respectively, of uncoded serial digital data on a magnetic recording medium, said apparatus comprising:

a first channel including first gating means having first and second input ports and an output port for receiving the data signal at the first input port thereof, first switching means having an input port coupled to the output port of the first gating means, a clock input port coupled to a first source of regularly recurring pulses and a true output port coupled to the second input port of the first gating means, and first magnetic head coupled to the true output port of the first switching means for recording one-bits of digital information in the form of reversals of magnetic flux polarity on one track of the recording medium in response to changes in the phase of the signal at the true output port of the first switching means, said reversed flux polarity continuing until the next one-bit of digital information is received and said changes of that last-mentioned phase occurring during the occurrence of one of the regularly recurring pulses and in response to changes in the phase of the signal at the output port of the first gating means;

a second channel including second gating means having a first input port coupled to the first input port of the first gating means for receiving the data signal, a second input port and an output port, second switching means having an input port coupled to the output port of the second gating means, a clock input port coupled to the first source of regularly recurring pulses, a not-true output port coupled to the second input port of the second gating means and a true output port, and second magnetic head coupled to the true output port of the second switching means for recording zero-bits of digital information in the form of reversals of magnetic flux polarity on another track of the recording medium in response to changes in the phase of the signal at the true output port of the second switching means, said reversal flux polarity continuing until the next zero-bit of digital information is received and said changes of that last-mentioned phase occurring during occurrence of one of the regularly recurring pulses and in response to changes in the phase of the signal at the output port of the second gating means;

said changes in the signal at the output ports of the first and second gating means occurring in response to changes in the relative phase of the signals coupled to the first and second input ports of the first and second gating means.

2. The recording apparatus as in claim 1 wherein the signal at the output port of the first and second gating means changes phase whenever the relative phase of the signals coupled to the first and second input ports of those gating means changes from the same phase to opposite phase or from opposite phase to the same phase.

3. The recording apparatus as in claim 1 wherein only one of the first and second gating means respond to the first and second phases of the data signal during occurrence of any one of the regularly recurring pulse periods.

4. The recording apparatus as in claim 1 wherein:

the first and second gating means are exclusive OR gates; and the first and second switching means include clocked flip-flops.

5. The recording apparatus as in claim 1 further including first and second playback means and output means wherein:

the first playback means includes the first magnetic head for providing an electronic output signal in response to reversals of magnetic flux polarity recorded on the first track of the recording medium, first detector means coupled to the first transducer means for detecting the output signal thereof, third switching means having a signal input port coupled to the detector means, a clock input port coupled to a second source of regularly recurring pulses and a true output port, a fourth switching means having a signal input port coupled to the true output port of the third switching means, a clock input port coupled to the second source of regularly recurring pulses and a true output port, and a first output gate having two input ports coupled to the true output ports of the third and fourth switching means and an output port for providing an output signal in the form of changes of signal phase for every one-bit of information recorded on one channel of the recording medium in response to changes in the relative phase of the signals at the input ports of the first output gate during the occurrence of one of the regularly recurring pulses from the second source;

the second playback means includes the second magnetic head for providing an electronic output signal in response to reversals of magnetic flux polarity on the second track of the recording medium, second detector means coupled to the second transducer means for detecting the output signal thereof and fifth switching means having a signal input port coupled to the second detector means, a clock input coupled to the second source of regularly recurring pulses and a true output port, sixth switching means having a signal input port coupled to the true output port of the fifth switching means, a clock input port coupled to the second source of regularly recurring pulses and a true output port, and a second output gate having two input ports coupled to the true outputs of the fifth and sixth switching means and an output port for providing an output signal in the form of changes of signal phase for every zero-bit of information recorded on the other channel of the recording medium in response to changes in the relative phase of the signals at the input ports of the second output gate during the occurrence of one of the regularly recurring pulses from the second source; and the output means includes a cross-coupled latch having two input ports, one input port being coupled to the output port of the first output gate, the other input port being coupled to the output port of the second output gate and an output port for providing the data signal in response to the signals at the output ports of the first and second output gates, and includes a phase-inverting gate having one input port coupled to the output port of the first output gate and another input port being coupled to the output port of the second output gate, and an output for providing a timing signal having pulses recurring at the same rate as the pulses generated by the first source of regularly recurring pulses in response to the signals at the output ports of the first and second output gates.

6. The recording apparatus as in claim 5 wherein the timing signal may be used to set the sequence and timing of the data signal provided at the output port of the cross-coupled latch.

7. The recording apparatus as in claim 5 wherein:

the first and second detector means includes threshold detectors;

the third, fourth, fifth and sixth switching means are clocked flip-flops; and the first and second output gates are exclusive OR gates.

8. The recording apparatus as in claim 5 wherein the rate of recurrence of the pulses provided by the second source of regularly recurring pulses is faster than the rate of recurrence of the pulses provided by the first source of regularly recurring pulses.

* * * * *

UNITED STATES PATENT AND TRADEMARK OFFICE

CERTIFICATE OF CORRECTION

PATENT NO. : 3,921,211

DATED : November 18, 1975

INVENTOR(S) : Chung C. Tung and Robert D. Schweizer

It is certified that error appears in the above-identified patent and that said Letters Patent are hereby corrected as shown below:

Column 2, line 63, "203 Immediately" should read -- 102. Immediately --;

Column 3, line 8, "reamins" should read -- remains --.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*